United States Patent [19]

Lindblom et al.

[11] 4,022,133
[45] May 10, 1977

[54] LATERAL TRUCK MOVEMENT CONTROL SYSTEM

[75] Inventors: K. Julius Lindblom, Sollentuna; Anders S. E. Kipping, Enskede, both of Sweden

[73] Assignee: Automatisk Doserings Kompensator AB, Sollentuna, Sweden

[22] Filed: Jan. 14, 1975

[21] Appl. No.: 531,378

[52] U.S. Cl. .......................... 105/157 R; 104/1 A; 105/171; 105/179; 295/1
[51] Int. Cl.² ...................... B61D 3/12; B61D 3/16; B61D 5/38; B61D 13/00
[58] Field of Search .......... 105/1 R, 168, 169, 178, 105/179, 180, 157 R, 1 A, 188, 4 R, 171; 295/1; 246/120; 324/37 R; 104/1 R, 1 A

[56] References Cited
UNITED STATES PATENTS

| 1,256,558 | 2/1918 | Hild | 105/169 X |
| 1,463,137 | 7/1923 | Makepeace | 105/169 |
| 2,011,425 | 8/1935 | Sperry et al. | 324/37 R |
| 2,042,622 | 6/1936 | Montrose-Oster | 105/169 |
| 2,042,623 | 6/1936 | Montrose-Oster | 105/169 |
| 2,252,789 | 8/1941 | VanDorn | 105/4 R |

FOREIGN PATENTS OR APPLICATIONS

| 1,064,977 | 9/1959 | Germany | 105/169 |

Primary Examiner—L. J. Paperner
Assistant Examiner—Howard Beltran
Attorney, Agent, or Firm—Oldham & Oldham Co.

[57] ABSTRACT

A device for reducing the lateral movements of a railway vehicle caused by irregularities in the rail. The railway vehicle contains at least one wheel which is mounted for limited rotation around a generally vertical axis. A separate power-operated control means for performing limited rotation receives signals from a sensing means so that the wheel is turned around the generally vertical axis in such a direction that the effect of the irregularities are reduced.

7 Claims, 7 Drawing Figures

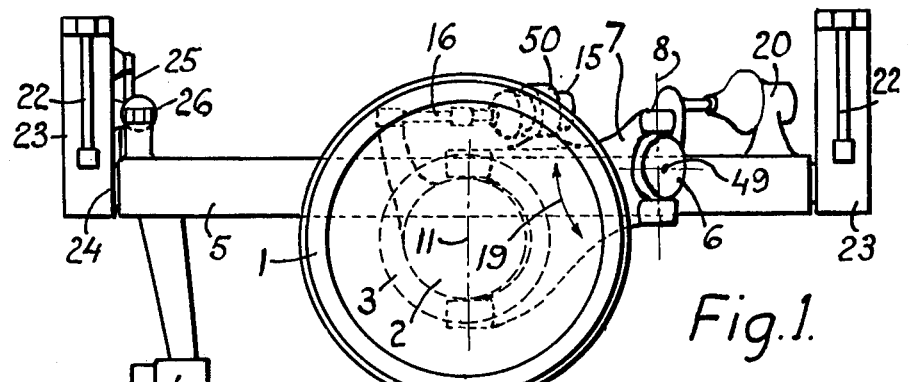
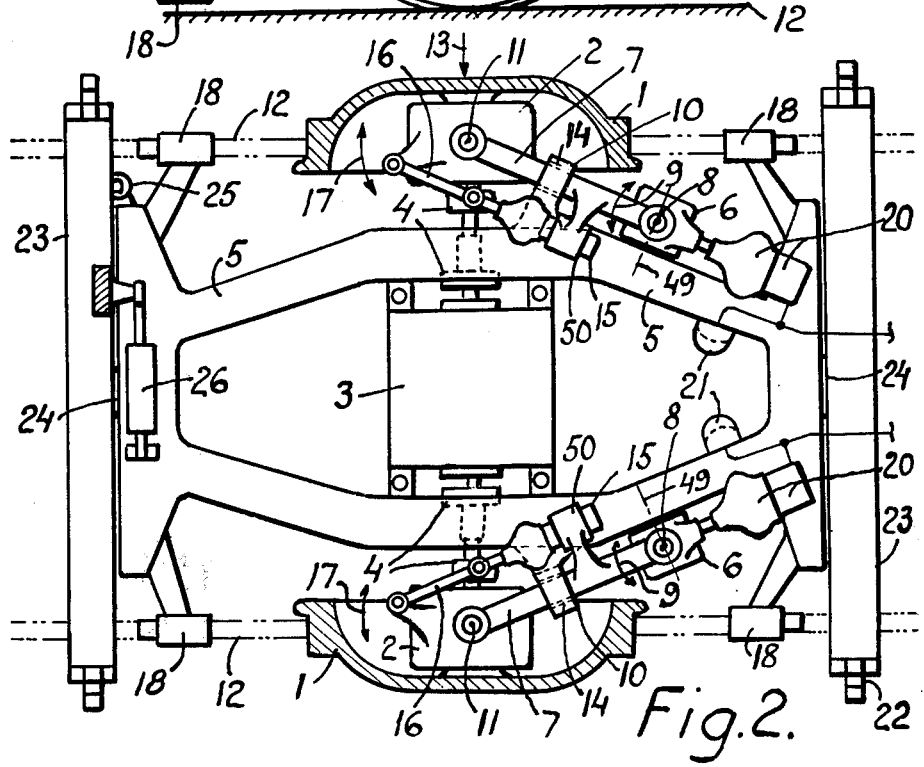

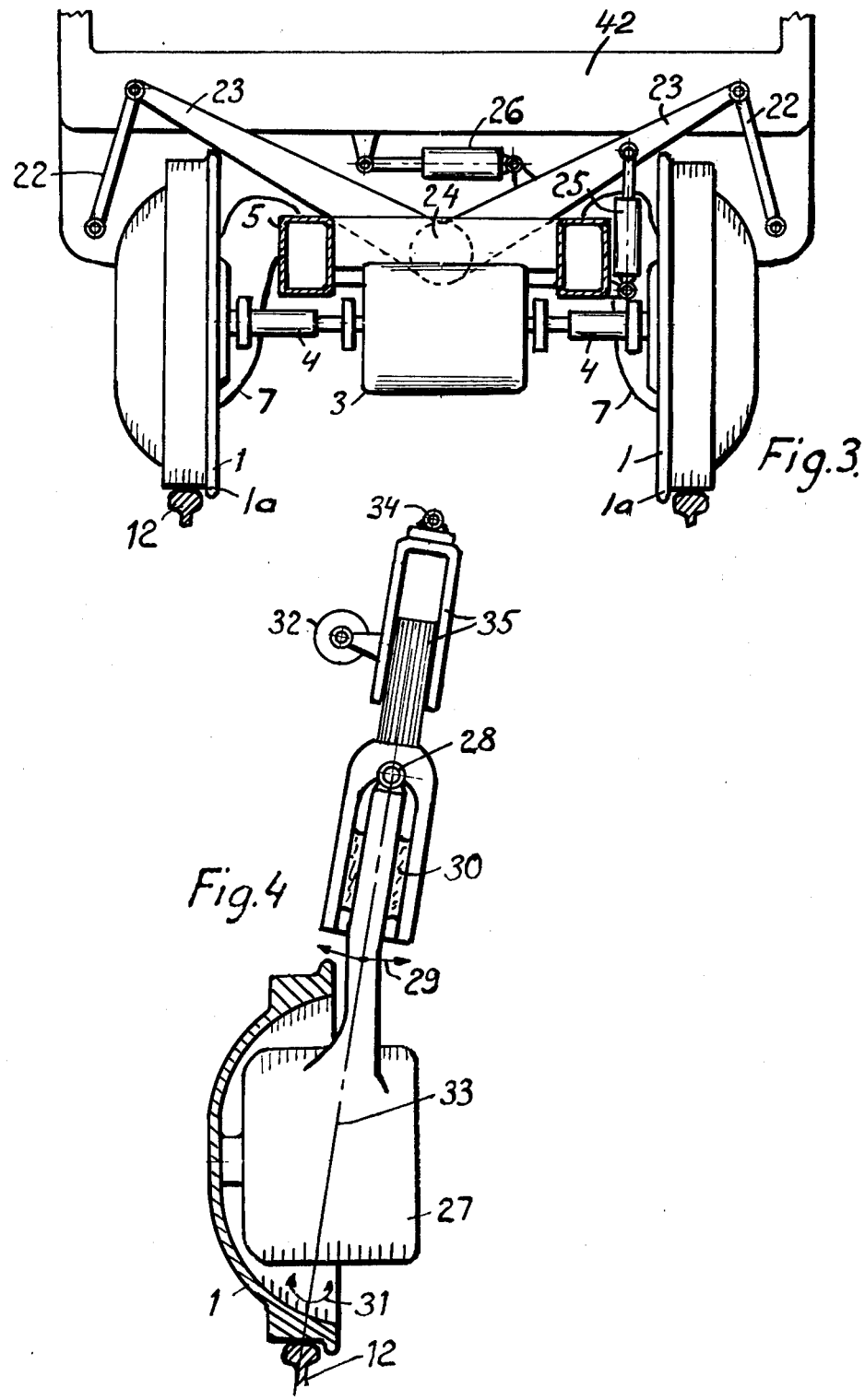

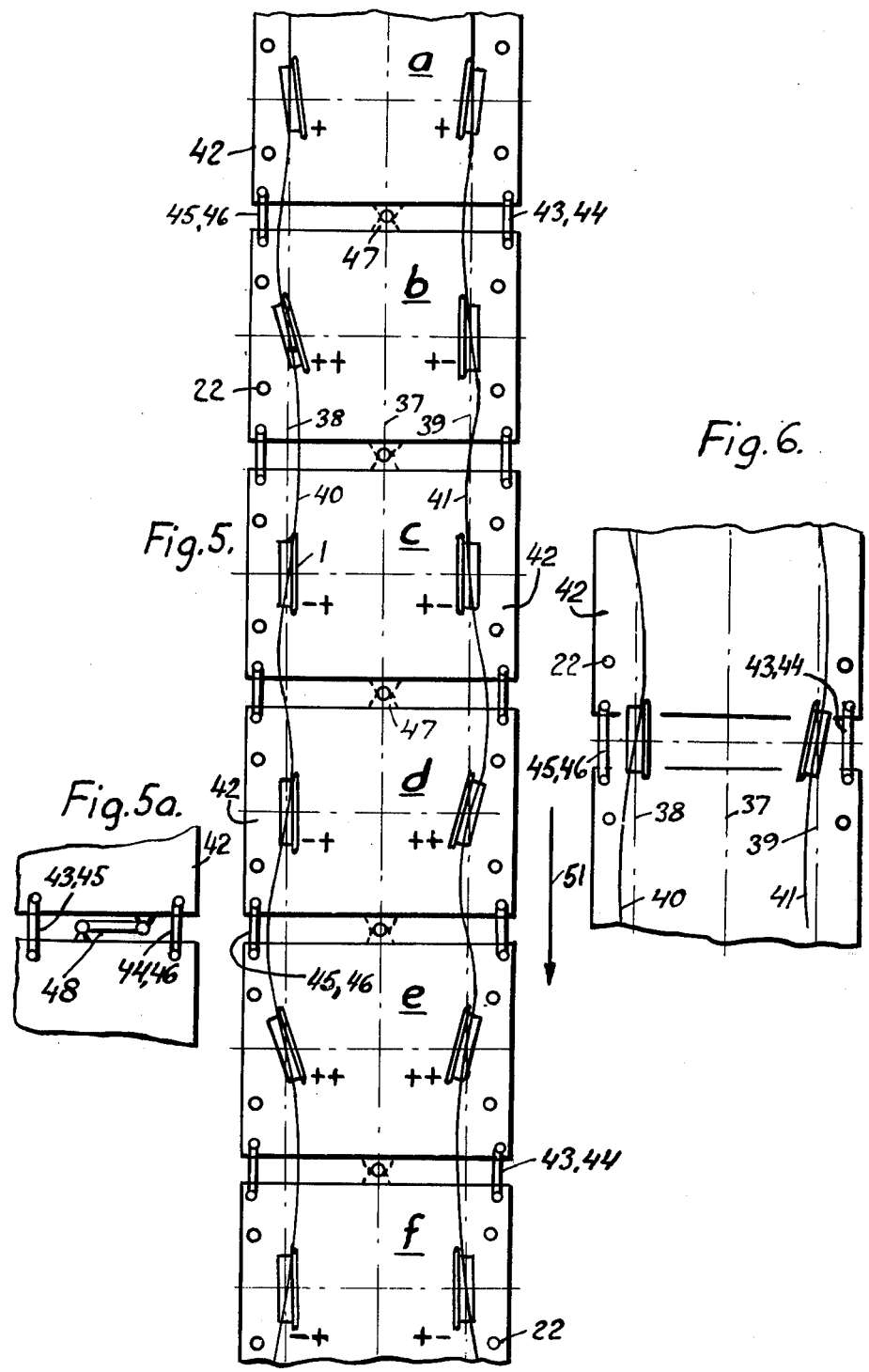

LATERAL TRUCK MOVEMENT CONTROL SYSTEM

The present invention relates to devices for reducing lateral movement of a wheeled vehicle caused by irregularities in the ground carrying said vehicle.

Attempts have been made to reduce thrusts on and sways of wheeled vehicles caused by irregularities in vertical and horizontal planes in the ground when the wheels are rolled thereon. Different spring systems including shock absorbers have been used heretofore in order to reduce the negative effects of the irregularities on the vehicle bodies. To reduce vertical thrusts and sways is often not a big problem and, moreover, such thrusts and sways are not so troublesome as thrusts and sways in a horizontal direction. In order to reduce the lateral movements of the vehicle bodies it is customary to use boggies for railway vehicles which are so designed that a lateral thrust on a wheel essentially is halved before it is transferred to the vehicle body. However, the wheels in each pair of wheels are coupled to each other by means of a stiff, fixed shaft which results in that the irregularities in the rails wear the wheels unevenly and that so called "sine motion" of the vehicle appears which increases the wear further and causes that the comfort of the passengers decreases.

The object of the present invention is to provide a device which generally eliminates the lateral movements of the vehicle when it is moved on an irregular ground and which is simple, reliable and swiftly settable to desired positions.

This object is accomplished in that at least one of the wheels is movable in relation to the vehicle in a direction generally horizontal and perpendicular to the direction of motion of the vehicle and/or is mounted for limited rotation around a generally vertical axis, said rotation being initiated by means sensing said irregularities.

An embodiment of the invention will now be described in connection with the enclosed drawings on which FIG. 1 is a side view of a shaft system of a railway vehicle including the device according to the invention, FIG. 2 is a horizontal view of the device according to FIG. 1.

FIG. 3 is an end view of the device according to FIG. 1 of adjacent cars of the railway vehicle with one removed.

FIG. 4 is an alternate embodiment of the invention and shows an end view of a single wheel mounted directly on the body of the vehicle, FIG. 5 is a schematic view seen from above and shows a part of a vehicle (vehicle set), the location of the wheels and coupling means between the vehicle bodies, FIG. 5a is a schematic side view of parts of two adjacent vehicle bodies according to FIG. 5, and FIG. 6 is a schematic view, seen from above, of parts of two adjacent vehicle bodies with the wheels located between these bodies.

On the drawings the numeral 1 designates two wheels located on each side of the vehicle in a frame 5. Wheels 1 thus constitute a pair of wheels which carries a whole vehicle body or a part of a vehicle body via frame 5. Each wheel 1 is rotatably mounted on a bearing box 2 and is driven, and is eventually also braked, by a motor 3 via drive shafts and elastic couplings 4. Two bearings 6 are fastened to frame 5 and one end of each of two swinging arms 7 is individually turnably mounted in one of such bearings around generally vertical axes 8 in directions 9 and around generally horizontal axes 49 in directions 19. The turning movement of arms 7 in directions 9 is limited around a mean position by suitable limiting elements 10 enclosing the arms and fastened to frame 5. The other ends of arms 7 are turnably mounted on bearing boxes 2 around a generally vertical axis 11.

The railway vehicle is driven on rails 12. If, on one or the other of rails 12, the vertical edge which is turned against the centre of the vehicle deviates from its predetermined direction parallel with the other rail, or if the distance between the inner edges of the rail is decreased, i.e. the rail has a short or long lateral irregularity, the flange 1a on wheel 1 located on the inner side of the rail will engage the rail so that the wheel receives a lateral movement, i.e. in direction 13 in FIG. 2. This movement is transferred to pertaining bearing box 2 and to swinging arm 7 which is turned around axis 8 in one of directions 9 (downwards in FIG. 2). Swinging arm 7 will then engage an indicator 14 which can consist of piezoelectric elements, fluidistors, electronic means, feeling ribs or similar means mounted in the limiting elements 10 and which transmits signals to hydraulic, pneumatic or similar control means 50. FIGS. 1 and 2 show that means 50 can consist of a cylinder in which a piston (not shown), connected to one end of a rod 16, is arranged for movement in the direction of rod 16. The other end of rod 16 is turnably mounted to bearing box 2. Thus, when control means 50 receives a signal from indicator 14, rod 16 in the upper part of FIG. 2 will be moved obliquely downwards whereby bearing box 2 is turned anticlockwise in the direction of arrow 17 around axis 11 so that wheel 1 gets a rolling direction in the direction of the initiating thrust which has the result that the wheel is rolled without flange contact on rail 12, i.e. it rolls obliquely relatively to the previous, normal rolling direction.

Instead of indicators 14, springs or other sensing means can be used which transfer the swinging movements of arm 7 to a turning movement of wheel 1, and instead of letting a force in the direction of arrow 13, caused by the engagement of rail 12 on wheel 1 via flange 1a, initiate the turning of wheel 1 around axis 11, sensing means 18 sensing the irregularities in rail 12 can be arranged on each side of the wheel. Sensing means 18 detect lateral irregularities before wheel 1 rolls over these irregularities. If the rolling direction of wheel 1 is to the left in FIGS. 1 and 2 the sensing means 18 to the left of the wheel detects the irregularities, and if the rolling direction is to the right means 18 to the right of wheel 1 will detect the irregularities. Sensing means 18, which can be positioned in connection with only the first pair of wheels in a vehicle set and control the turning of all the wheels coming after said pair of wheels in the direction of motion of the vehicle set, thus replace the indicator 14 in the limiting means 10 and transmit signals directly to control means 50. By arranging sensing means ahead of wheels 1 the advantage is obtained that the wheels can be turned to the desired position immediately before they pass the irregularities of the rails whereby flange contact and lateral thrusts on the vehicle bodies are eliminated. When an irregularity has passed a wheel 1 the wheel is restored to its normal position because flange 1a is removed from rail 12 again or sensing means 18 generates a restoring signal.

When a wheel passes irregularities extending vertically from rails 12, swinging arms 7 will be turned in directions shown by arrows 19 in FIG. 1. For this purpose are used conventional spring devices, such as gas-liquid springs including piston-cylinder means 20 and gas tanks 21 fixed to frame 5.

As is evident from FIGS. 1–3 the vehicle bodies can be suspended in pendulum elements 22 which are turnably mounted in frame 5, and if the vehicle is intended to be driven at a high speed in curves the vehicle bodies can be inclined to positions towards the curves in order to improve the comfort for the passengers. The ends of elements 22 which are not pivotally mounted on frame 5 is pivotally mounted on a link 23, for instance, which is rockable around a shaft 24 in the frame (FIG. 3). The inclination of the vehicle bodies in curves is accomplished by means of piston-cylinder means 25 controlled by curve sensing means (not shown). By means of piston-cylinder means 26 the vehicle bodies can also be moved laterally on pendulum elements 22 during the inclination of the same in order that the passengers shall move in an essentially vertical direction which increases the comfort of the passengers.

In FIG. 4 there is shown a single wheel 1 mounted on drive and brake means 27 in a conventional manner. Wheel 1 is rotatable or turnable around a generally horizontal axis around a hinge 28 in directons 29. Means 30 limit the magnitude of the turning movement. The wheel 1 can also be turned around a generally vertical axis 33 (arrows 31) by means of piston-cylinder means 32 on frame 5. A hinge 34, which connects the wheel to the vehicle body, permits the turning of the wheel around the axis 33. Piston-cylinder means 35, which are so coupled together that the piston and the cylinder can be turned as a unit around axis 33, permits the hinge 34 and thereby the vehicle body to be moved in a direction upwards or downwards relative to the wheel when the vehicle body is inclined in curves.

FIG. 5 shows a railway vehicle set according to the invention passing an irregular track in a motion direction 49. The theoretical center line 37 lies between the theoretical center lines 38 and 39 and the actual lines 40 and 41 of the rails. The wheels are preferably preset with a certain degree of toe-in which is designated + in FIG. 5 (both wheels 1 on vehicle body a have this setting, i.e. the rails are straight and have no lateral irregularities). The toe-in angle can be 0.05°, for instance, and can be preset by means of a two-position means 15 in dependence of the desired direction of motion. For instance, means 15 may consist of a cylinder co-operating with control means 50.

Wheel 1 may also be preset to such a position at axis 33 in FIG. 4 (so called negative steering radius) that the desired toe-in angle will be set automatically when drive means 27 rotates the wheel on the rail.

To preset the wheels with a certain degree of toe-in or with a negative steering radius causes that there will be no flange contact between the wheels and the straight rails and that the wheels and the rails are cleaned and makes them somewhat rugged or rough which increases the driving and braking capacity and reduces skids.

From the preset toe-in position each wheel 1 can be turned outwards or inwards an angle being approximately 0.0°, for instance, when it passes lateral irregularities in the rails. When such an irregularity is directed outwards from the center line 37 in the direction of motion of the vehicle this toe-in is decreased and is designated −+ and +−(both the wheels on vehicle body f and the right wheel on vehicle body c, for instance). When a lateral irregularity in a rail 12 is directed towards center line 37 in the direction of motion the toe-in angle will be increased and is designated ++(both the wheels on the vehicle body e and the left wheel on vehicle body b, for instance). In a curve, which is interpreted by the indicator 14 or sensing means 18 as a long rail irregularity, the outer wheels will be steered or turned to toe-in ++ and the inner wheels will be steered or turned to toe-in −+ by means of control means 50, 16. This is shown for vehicle body d in FIG. 5. By this, the undesired flange contact will never appear.

As is evident from FIGS. 5 and 5a vehicle bodies 42 are coupled together by means of inert shock absorbing hinges 43–46 which are arranged on and at the side of each other. Additional inert means 48 between hinges 43, 44 and 45, 46, respectively, which counteracts rocking motions, and a coupling hinge 47 can also be arranged between the vehicle bodies. The effect of hinges 43–46 and 48 is that the whole set of vehicle bodies will be rigidly linked to form an inertly hinged unit. If an irregularity in a rail 12 has such a great dimension that a wheel 1 can not be turned sufficiently to compensate for the irregularity the frame 5 on which this wheel is mounted will also be moved laterally but the effect of this irregularity will not be entirely transferred to the pertaining vehicle body since this body is rigidly coupled to the two adjacent vehicle bodies on each side thereof by means of hinges 43–46. Restoration to a mean position relative to the normal through the other frames 5 in the set of vehicle bodies will be done after the irregularity has been passed.

In FIG. 5 it is shown that each pair of wheels is mounted centrally under a vehicle body in the direction of motion of the vehicle. The location of the pairs of wheels, however, is optional and may be as is shown in FIG. 6 i.e. between the separate vehicle bodies.

The invention is not limited to the embodiments described above in connection with the enclosed drawings. The device can be modified by a person skilled in the art without departing from the idea of the invention. Thus, the invention is only limited by that which is stated in the following claims.

We claim:

1. A device for reducing lateral movements of a railway vehicle caused by irregularities in the vertical surfaces of the rails carrying said vehicle, comprising, at least one wheel flange of the vehicle mounted on the vehicle by support means for limited rotation around a generally vertical axis, a separate power-operated control means for performing said limited rotation by engaging said support means and being operatively connected between the wheel flange and the vehicle, said separate power-operated control means being actuated and controlled by means for sensing the irregularities in the rail thus affecting the flange.

2. A device according to claim 1, wherein said wheel comprises elements which are arranged to be engaged by the irregularities so that the wheel receives a movement in a direction generally horizontal and perpendicular to the direction of motion of the vehicle, said movement being sensed by said sensing means, said sensing means emits signals to said control means which turns the wheel around the generally vertical axis in such a direction that the effect of the irregularities on the wheel will be reduced.

3. A device according to claim 1, wherein said sensing means is located ahead of the wheel in the direction of motion of the vehicle and emits signals to said control means to turn the wheel around the generally vertical axis in such a direction that the effect of the irregularities on the wheel will be reduced.

4. A device according to claim 1, wherein said control means comprises fluid operated members.

5. A device according to claim 1, including a two-position means for presetting the wheel around the generally vertical axis with a certain toe-in-angle in at least one of the two directions of movement of the vehicle.

6. A device according to claim 5, wherein said two-position means consists of fluid operated members including elements common to elements in the piston-cylinder members of said control means.

7. A device for reducing the lateral movement of a railway vehicle caused by irregularities in the vertical surfaces of the rails carrying said vehicle, comprising, at least one wheel flange of the vehicle mounted for limited rotation around a generally vertical axis, a separate power-operated control means for performing said limited rotation, and connected between the wheel and the vehicle, said separate power-operated control means being actuated and controlled by means for sensing the irregularities in the rail affecting the wheel flange, and at least one pair of wheels being mounted to a frame supporting the ends of two adjacent vehicle bodies.

* * * * *